Dec. 2, 1924.                                                                  1,517,717
H. EKMAN
COMBINED WALL BRUSH AND CASING KNIFE
Filed Feb. 4, 1924
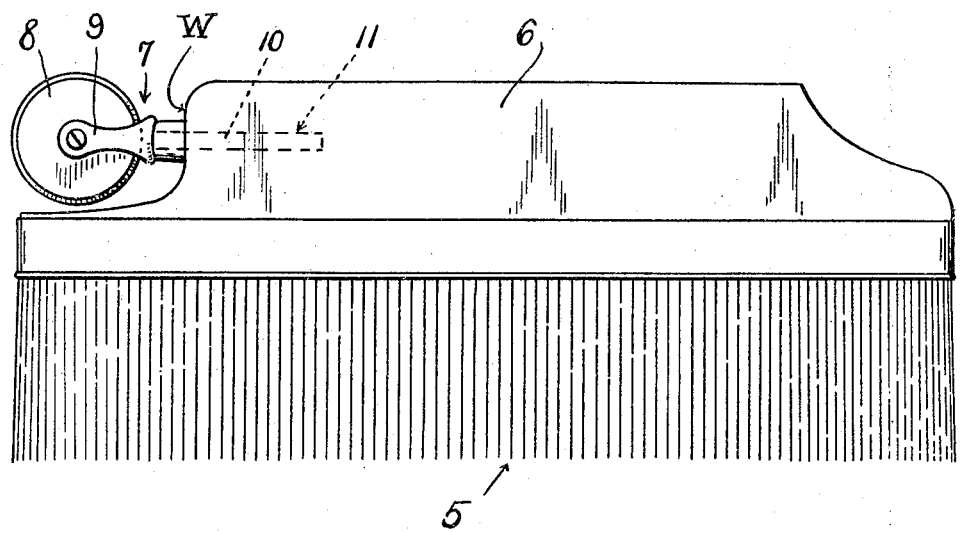
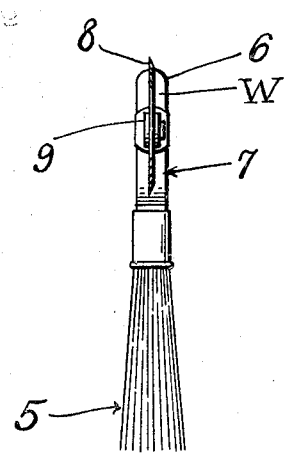
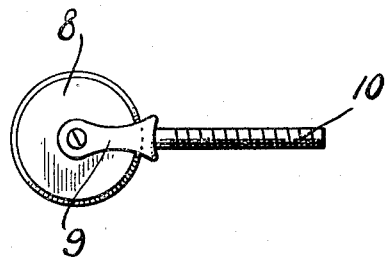
Inventor
H. Ekman
By L. B. James
Attorney Patented Dec. 2, 1924.

1,517,717

UNITED STATES PATENT OFFICE.

HJALMAR EKMAN, OF BESSEMER, MICHIGAN.

COMBINED WALL BRUSH AND CASING KNIFE.

Application filed February 4, 1924. Serial No. 690,486.

*To all whom it may concern:*

Be it known that I, HJALMAR EKMAN, a citizen of the United States, residing at Bessemer, in the county of Gogebic and State of Michigan, have invented new and useful Improvements in a Combined Wall Brush and Casing Knife, of which the following is a specification.

This invention relates to paperhanger's tools and more particularly to a combined wall-brush and casing knife.

The primary object of this invention resides in assembling two of the most important tools utilized in practicing the art of paperhanging into compact relation so a decorator can more expediently practice his trade.

Another object of this invention resides in altering the structure of the common wall-brush and casing knife, used in paperhanging, so they can be readily assembled in compact relation and used to better advantage than when uitlized separately.

A still further object of this invention resides in constructing the handle of a paperhanger's wall-brush so a casing knife can be operatively disposed thereon at a point remote to the usual gripping portion thereof.

With these and other objects in view, this invention resides in certain novel features of construction, arrangement, and combination of elements to be hereinafter set forth in the specification, illustrated in the accompany drawing, and pointed out in the appended claim.

In the accompanying drawing,

Fig. 1 is a side view of a paper-hanger's wall-brush showing a casing knife associated therewith;

Fig. 2 is an end view thereof; and

Fig. 3 is a detail view of the casing knife.

In the present embodiment of this invention, the numeral 5 designates a paperhanger's wall-brush having its handle portion 6 preferably cut away at one end to form a recess 7 for the reception of a rotatable casing knife 8.

The rotatable casing knife 8 is carried by a yoke 9 having a stem 10 adapted to be secured in a recess 11 in the wall W of the recess 7, said rotatable casing knife 8 being so disposed in the recess 7 that its cutting edge will project beyond the top of the handle and end of the brush.

With this invention fully set forth, it is manifest that the two most important tools necessary to practicing paperhanging have been combined into compact relation and, through the simplicity of the structure involved, the same can be manufactured cheaply.

Having thus described my invention, what I claim and desire to protect by Letters Patent is:

In a paperhanger's wall-brush having a recess in its handle provided with an aperture in one wall thereof, a casing knife disposed in the recess of the handle with its edge projecting beyond the top of the handle and the end of the brush, a yoke rotatably supporting the casing knife, and a stem on the yoke projecting into the aperture in the wall of the recess.

In testimony whereof I affix my signature.

HJALMAR EKMAN.